United States Patent [19]

Brandt et al.

[11] Patent Number: 5,552,819

[45] Date of Patent: Sep. 3, 1996

[54] SYSTEMS AND METHOD FOR PRINTING BY APPLYING AN IMAGE-ENHANCING PRECOAT

[75] Inventors: Thomas J. Brandt, Canby; Stephen A. Zimmerman, Wilsonville, both of Oreg.

[73] Assignee: Tektronix, Inc., Wilsonville, Oreg.

[21] Appl. No.: 414,994

[22] Filed: Mar. 31, 1995

Related U.S. Application Data

[60] Division of Ser. No. 962,367, Oct. 16, 1992, abandoned, which is a continuation-in-part of Ser. No. 930,572, Aug. 17, 1992, abandoned, which is a continuation-in-part of Ser. No. 762,537, Sep. 18, 1991, abandoned.

[51] Int. Cl.⁶ ............................................. B41J 2/32
[52] U.S. Cl. .................................................. 347/212
[58] Field of Search ............................... 347/17.1, 212; 400/120.18, 120.01

[56] References Cited

U.S. PATENT DOCUMENTS

| | | | |
|---|---|---|---|
| 3,989,131 | 11/1976 | Knirsch et al. | 197/1 R |
| 4,080,897 | 3/1978 | Gundlach | 101/467 |
| 4,374,691 | 2/1983 | Vanden Bergh | 156/234 |
| 4,399,749 | 8/1983 | Arai | 100/211 |
| 4,415,903 | 11/1983 | Kawanishi et al. | 346/1.1 |
| 4,442,342 | 4/1984 | Yoneda | 219/216 |
| 4,491,432 | 1/1985 | Aviram et al. | 400/241.1 |
| 4,503,095 | 3/1985 | Seto et al. | 427/265 |
| 4,525,722 | 6/1985 | Sachdev et al. | 346/1.1 |
| 4,527,171 | 7/1985 | Takanashi et al. | 346/76 PH |

(List continued on next page.)

FOREIGN PATENT DOCUMENTS

| | | |
|---|---|---|
| 193342A | 2/1986 | European Pat. Off. . |
| 55-71585 | 5/1980 | Japan . |
| 58-219087 | 12/1983 | Japan . |
| 59-61273 | 5/1984 | Japan . |
| 60-9772 | 1/1985 | Japan . |
| 60-189461 | 9/1985 | Japan . |
| 60-199676 | 10/1985 | Japan . |
| 61-286194 | 12/1986 | Japan . |
| 61-286193 | 12/1986 | Japan . |
| 62-5863 | 1/1987 | Japan . |
| 62-38160 | 2/1987 | Japan . |
| 62-80078 | 4/1987 | Japan . |
| 62-77987 | 4/1987 | Japan . |
| 62-108089 | 5/1987 | Japan . |
| 62-257863 | 10/1987 | Japan . |
| 62-282954 | 12/1987 | Japan . |
| 63-4970 | 1/1988 | Japan . |
| 63-134259 | 6/1988 | Japan . |
| 63-253201 | 10/1988 | Japan . |

OTHER PUBLICATIONS

Maehashi, et al., *Journal of Imaging Science*, vol. 35, No. 6, Nov./Dec. 1991, pp. 387–393.

Aviram, et al., *Journal of Imaging Technolgy*, vol. 17, pp. 295–298 (1991).

"Relation Between Dymanic Characteristics of Thermo-–Fusible Ink and Print Quality in Thermal Transfer Printing," *Journal of Imaging Technology*, vol. 17, pp. 119–122, Jun./Jul. 1991.

Tokunega et al., *IEEE Trans. of Electron. Devices*, vol. ED–27, pp. 218–222, 1980.

*Primary Examiner*—Huan H. Tran
*Attorney, Agent, or Firm*—Ralph D'Alessandro; John D. Winkelman

[57] ABSTRACT

A system and method for printing a predetermined image onto a substrate includes steps or structure for determining a first area on the substrate where a colorant is to be deposited; determining a second area which is immediately adjacent to the first area; depositing an image-enhancing precoat over the first area and the second area; and depositing a colorant on the exposed surface of the image-enhancing precoat substantially so as to be over the first area, whereby a border of precoat material will be defined about the printed image on the substrate. A second aspect of the disclosure involves sealing a printed image on a substrate by applying an aftercoat.

15 Claims, 8 Drawing Sheets

U.S. PATENT DOCUMENTS

| | | | |
|---|---|---|---|
| 4,532,523 | 7/1985 | Tanaka | 346/76 PH |
| 4,536,771 | 8/1985 | Tanaka | 346/76 PH |
| 4,549,824 | 10/1985 | Sachdev et al. | 400/241.1 |
| 4,555,714 | 11/1985 | Takanashi et al. | 346/76 PH |
| 4,590,490 | 5/1986 | Takahashi et al. | 346/76 PH |
| 4,623,580 | 11/1986 | Koshizuka et al. | 428/216 |
| 4,633,269 | 12/1986 | Mikami et al. | 346/76 PH |
| 4,652,892 | 3/1987 | Tanaka | 346/76 PH |
| 4,670,307 | 6/1987 | Onishi et al. | 427/261 |
| 4,691,211 | 9/1987 | Brownstein | 346/76 PH |
| 4,704,615 | 11/1987 | Tanaka | 347/212 |
| 4,764,776 | 8/1988 | Mugrauer et al. | 346/76 R |
| 4,804,976 | 2/1989 | Ohmori et al. | 346/76 PH |
| 4,827,286 | 5/1989 | Sukigara et al. | 346/76 PH |
| 4,827,288 | 5/1989 | Mori et al. | 346/76 PH |
| 4,870,428 | 9/1989 | Kuwabara et al. | 346/76 PH |
| 4,884,080 | 11/1989 | Hirahara et al. | 346/46 |
| 4,922,271 | 5/1990 | Nilsson et al. | 346/140 |
| 4,952,085 | 8/1990 | Rein | 400/120 |
| 4,955,736 | 9/1990 | Iwata et al. | 400/120 |
| 5,010,352 | 5/1991 | Takei et al. | 346/76 PH |
| 5,051,755 | 9/1991 | Takahashi et al. | 346/76 PH |
| 5,099,259 | 3/1992 | Hirahara et al. | 346/76 PH |

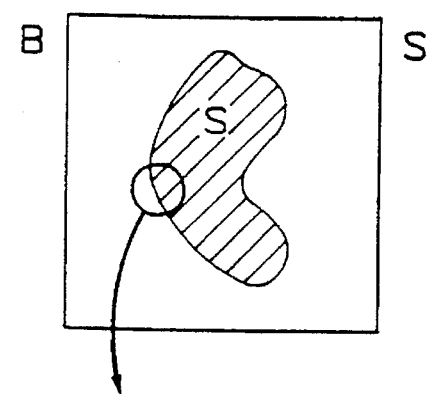
Fig. 4A
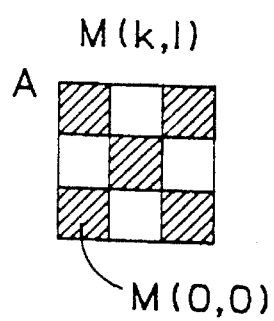
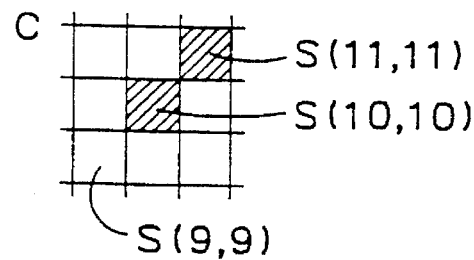
Fig. 4B  Fig. 4C

00000010000100000000001111111100000

000000100001000000000011111110⓪⓪⓪00

11100000000000001111111000000000011

11110000000000001111111100000001111

00001111111111110000000011111110000

00000010000100000000001111111100000

SYSTEMS AND METHOD FOR PRINTING BY APPLYING AN IMAGE-ENHANCING PRECOAT

This application is a division of application Ser. No.: 07/962,367, filed Oct. 16, 1992 now abandoned, which is a Continuation-in-part of application Ser. No. 07/930,572, filed Aug. 17, 1992 now abandoned, which in turn is a Continuation-in-part of Ser. No. 07/762,537, filed Sept. 18, 1991, now abandoned. The disclosures of both of the above-referenced documents are hereby incorporated as if set forth fully herein.

BACKGROUND OF THE INVENTION

1. Field of the Invention

This invention relates to improved methods of monochromatic and color printing on various types of substrate surfaces. More specifically, this invention relates to systems and methods for determining where to apply an image-enhancing precoat to a substrate in a thermal transfer printing (e.g., thermal wax transfer, dye diffusion transfer or the like) process.

2. Description of the Prior Art

Thermal transfer printing, as defined herein, includes the known printing methods of thermal wax transfer printing, thermal dye diffusion printing, and the like.

Thermal wax transfer printing involves the transfer of a colorant, which is dispersed in a wax base material, from a carrier onto a substrate surface such as smooth paper in a controlled manner to generate an image. A thermal transfer print engine having a large number of independently activatable heating elements per unit of length is one apparatus that has been employed for this purpose. The carrier is most often placed within the print engine such that one side of the carrier is adjacent to the heating elements and a second, opposite side bearing the wax base material is positioned adjacent to the substrate surface upon which printing is intended.

To accomplish image generation, the print engine and substrate are moved relative to each other. If a color is intended to be deposited at a location on the substrate surface with which the printhead is aligned, the appropriate heating element is activated, and the carrier is locally heated to a temperature at or above the melting point of the colorant. When this happens, an amount of the wax-based ink in the colorant softens and adheres to the substrate at the desired location, breaking away from the carrier and the unheated or insufficiently heated colorant. In generating a subtractive color image, three (cyan, magenta and yellow) or four (cyan, magenta, yellow and black) sequential passes are made over the same substrate with different carriers, each of which is dedicated to one of the primary colors.

Dye diffusion printing involves the transfer of a dye colorant from a carrier, such as a polymer ribbon, onto a specialized substrate surface, such as a polyester sheet, in a controlled manner to generate an image. A thermal transfer print engine and three different color dye/carrier structures may also be employed in this type of image generation, utilizing similar heat-induced, subtractive color printing techniques. The operating principles for dye diffusion are different from those of thermal wax transfer printing, however. In dye diffusion applications, the amount of dye deposited at a single location can be varied, so that more subtle color gradations are achievable. Images of near photo quality have been produced using dye diffusion technology.

If a color is to be deposited at a location on the substrate surface with which the printhead of the thermal transfer print engine is aligned, the appropriate heating element is activated, and the dye/carrier structure is heated to a temperature sufficient to cause migration of an appropriate amount of dye, thereby releasing the dye from the carrier in the vicinity of the specially structured substrate. In this manner, the appropriate amount of dye contacts and penetrates the substrate through molecular dispersion of the dye in the substrate at the desired location.

Many types of paper, particularly the bond-type paper which is popular in the United States, exhibit a rough surface, featuring plateaus and voids. Conventional prior art thermal transfer printing techniques cannot be effectively used with such paper, because the voids in the paper substrate surface structure cause adherence problems or broken ink or dye dots.

Also, most paper is not chemically compatible with diffusion dyes in a manner to provide a solid-in-solid dye-substrate solution. As a result, bright colored images cannot be generated on such substrates using dye diffusion technology. Since "plain paper" exhibiting a rough surface is less costly than specialized substrate materials, and high quality images are obtainable using thermal transfer techniques, methods of color printing on plain paper substrates are desirable.

It has recently been suggested to deposit a precoat onto the substrate surface which is smoother and more chemically compatible with the intended colorant than the substrate surface is. U.S. Pat. Nos. 4,527,171 issued to Takanashi et al., 4,670,307 issued to Onishi et al. and 4,704,615 issued to Tanaka are examples of thermal transfer printing systems which utilize a fusible binder material that is deposited as a precoating onto the substrate prior to printing.

Takanashi et al. coat the entire substrate upon which printing is intended with a layer of the binder material. This method effectively prepares the substrate for deposition of colorant during printing, but consumes a large amount of the binder which is used during the precoating process. In addition, it results in a discernable smoothening of the surface of the substrate, which may be objectionable to those who prefer the look and feel of plain paper.

In Tanaka, the precoating is applied to the substrate on a pixel by pixel basis, to the same pixel locations as where the deposition of colorant is intended. The precoating is applied to a slightly broader area at each pixel location than the colorant, as a result of a longer pulse width being applied to the printhead element during deposition of the precoat material. While the Tanaka system preserves the look and feel of plain paper for that portion of the substrate which had not been printed on, certain problems still exist. Specifically, it has been found that, in some instances, it is difficult to effectively apply the precoating to the substrate in discrete one pixel intervals. Such problems are most common in areas where the desired image requires that the colorant be applied only very sparsely to the substrate. In such areas, it appears that the combined effect of heat loss from a single activated heating element on the printhead and the transitional period needed to bring the heating element to its operational temperature result, at times, in a less than satisfactory deposition of the precoat material to the substrate.

It is clear that there has existed a long and unfilled need in the prior art for an improved system and method for making printed products which overcomes the disadvantages discussed above.

SUMMARY OF THE INVENTION

Accordingly, it is an object of the invention to provide a system and method for thermal mass transfer printing which is capable of producing a high-quality image on a substrate without materially changing the texture or appearance of the substrate.

It is an object of one aspect of the invention to provide a system and method for applying an image-enhancing precoat to a substrate in a thermal transfer printing process which may compensate for possible misregistration between applied precoat and the subsequent application of colorant.

It is further an object of the invention to provide a system and method for applying an image-enhancing precoat to a substrate in a thermal transfer printing process which will ensure that colorant may be applied to precoating, even in the event of the colorant pixels being slightly larger than the precoat pixels by virtue of their respective viscosity or other properties.

It is further an object of the invention to provide such a system and method, which ensures more than adequate adherence of the image to the substrate.

To achieve the above and other objects of the invention, a method of printing a predetermined image onto a substrate may include the steps of determining a first area on the substrate where a colorant is to be deposited; determining a second area which is immediately adjacent to the first area; depositing an image-enhancing precoat over the first area and the second area, the image enhancing precoat having an exposed surface which is adapted for receiving a colorant; and depositing a colorant on to the exposed surface of the image-enhancing precoat substantially so as to be over the first area, whereby a border of precoat material will be defined about the printed image on the substrate.

A method of printing a predetermined image on to a substrate according to a second aspect of the invention may include steps of determining a first area on the substrate where a colorant is to be deposited; determining a second area which is immediately adjacent to the first area; depositing a colorant substantially over the first area to create an image; and depositing the precoat over the first area and the second area for sealing the deposited colorant.

According to a third aspect of the invention, a system for printing a predetermined image on to a substrate may include first determining structure for determining a first area on the substrate where a colorant is to be deposited; second determining structure for determining a second area which is immediately adjacent to the first area; structure for depositing an image-enhancing precoat over the first area and the second area, the image enhancing precoat having an exposed surface which is adapted for receiving a colorant; and structure for depositing a colorant on to an exposed surface of the image-enhancing precoat substantially so as to be over the first area, whereby a border of precoat material will be defined about the printed image on the substrate.

A system for printing a predetermined image on to a substrate according to a fourth aspect of the invention may include first determining structure for determining a first area on the substrate where a colorant is to be deposited; second determining structure for determining a second area which is immediately adjacent to the first area; structure means for depositing a colorant substantially over the first area to create an image; and structure for depositing the precoat over the first area and the second area for sealing the deposited colorant.

According to a fifth aspect of the invention, a method of printing a predetermined image on to a substrate may include the steps of determining a coating area to which an image-enhancing coating is to be applied to the substrate, the determination being made by applying a filter mask to the predetermined image area, the filter mask containing a pattern which specifies where the coating area is to be placed; and, not necessarily in sequence, depositing an image-enhancing coating over said coating area; and depositing a colorant substantially on to said predetermined image area.

Another aspect of the invention embraces an operating method for a thermal transfer printing apparatus. A method of operating a thermal transfer printing apparatus comprising a plurality of heating elements adapted to be juxtaposed to a carrier comprising a colorant and an image-enhancing coating for printing on a substrate, may include the steps of determining a first set of heating elements corresponding to the position of the colorant to be applied to the substrate; determining a second set of heating elements immediately adjacent to the first set; energizing the first set and the second set to deposit an image enhancing coating on the substrate; and energizing the first set to deposit a colorant on the image enhancing coating without energizing the second set.

Another aspect of the invention involves a method for printing an image comprising predetermined pixels of colorant at predetermined pixel locations, including the steps of determining additional pixel locations adjacent to the predetermined pixel location; and depositing an image enhancing coating different from the colorant at the additional pixel locations adjacent to the predetermined pixel locations.

Yet another aspect of the invention involves a system for printing an image on a substrate, including a plurality of print head elements; structure for supporting a substrate relative to said print head elements; a multilayered precoat application ribbon positioned between said substrate and said print head elements, said multilayered ribbon including a backing layer, a separation layer adjacent to the backing layer which is formulated to separate from the backing layer when heated, and a adhesive layer which is formulated to adhere to the substrate; and structure for controlling the printhead elements, said controlling structure being constructed and arranged to: (a) determine pixels in a first area on the substrate where a colorant is to be deposited; (b) determine a second area which is immediately adjacent to said first area; and (c) selectively activate said print head elements to apply precoat from said ribbon to both said first area and said second area, whereby a border of precoat material will be defined about the printed image on the substrate.

The invention also embraces systems for performing the above-described methods.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIGS. 4A, 4B and 4C illustrate how a portion of the shadow mask area (shown in FIG. 4B and enlarged in FIG. 4C) will be expanded to create the surround area according to a filter which specifies the pattern of expansion as shown in FIG. 4A.

DETAILED DESCRIPTION OF THE PREFERRED EMBODIMENTS

Figure 1:
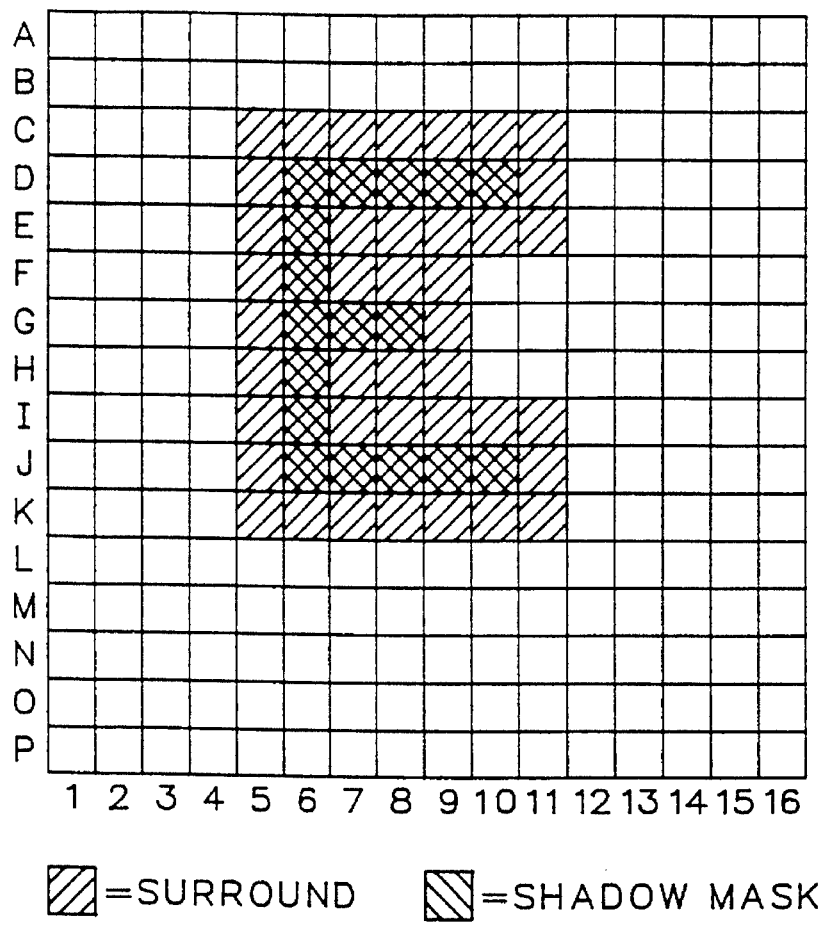
FIG. 1 is a diagram illustrating two areas which are pertinent to a preferred embodiment of the invention, the surround area and the shadow mask area for a letter "E."

Referring now to the drawings, wherein like reference numerals designate corresponding structure throughout the views, and referring in particular to FIG. 1, the letter "E" is depicted in printed form on the surface of a substrate, such as plain paper. If the surface of the plain paper is rough and considered to have a series of alternating peaks and valleys, the precoat material is formulated so that each precoat pixel will cover the rough surface to provide a colorant receiving surface which is more uniform than the rough surface. The precoat material may also be applied to smoother surfaces for the purpose of making the surface more chemically compatible for certain types of colorants, such as for dye diffusion-type printing. This invention provides a method for determining the extent of the area to which the image enhancing precoat will be applied. In creating the image of the letter "E" as shown in FIG. 1, both a first area directly underneath the image and an immediately adjacent second area are precoated.

Still referring to FIG. 1, the first area directly underneath the image may be termed the shadow mask area. The second area which is adjacent to the shadow mask area may be termed the surround area. While the precoat which is applied over the shadow mask area is intended to provide a colorant receiving surface, the precoat over the surround area is not so intended, although colorant inadvertently may be applied to the surround area due to the colorant, or the spreading effect caused by the lower viscosity of the colorant. This is most likely to happen during the course of multi-pass printing. Thus, the surround precoat serves to supplement the shadow mask precoat in enhancing an image on the edges of the image.

Figure 2:
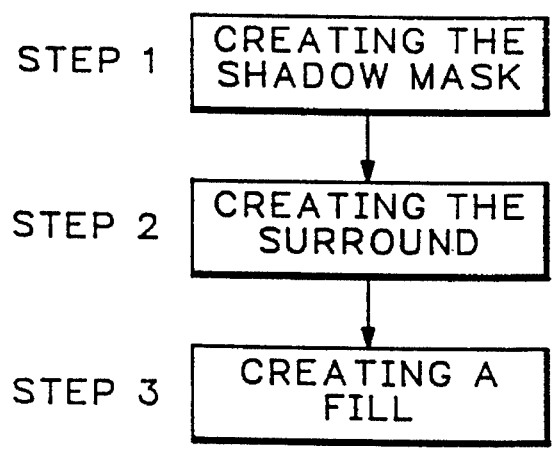
FIG. 2 is a general flowchart depicting the preferred steps involved in determining the two areas illustrated in FIG. 1, according to one embodiment of the invention.

FIG. 2 is a flow chart which provides an overview of a process according to a preferred embodiment of the invention. In order to determine the area where precoat material will be deposited on to the surface of the substrate, the preferred embodiment of the invention may be considered to include three major steps. The first two steps, namely Step 1 and Step 2, are necessary, while the last step, Step 3, is optional.

Step 1 involves the creation of a shadow mask array. The shadow mask array stores information on which pixel areas on substrate are intended to receive both colorant and precoat material. In other words, the shadow mask array defines an area directly underneath the intended image where both the precoat and colorant are deposited.

Still referring to FIG. 2, Step 2 involves determining the extent of the surround area which surrounds the shadow mask area. The purpose of the surround area, to which precoat material is also intended to be applied, is threefold. First, the surround area improves adherence of the precoat in the shadow mask area to the substrate through an anchoring effect. Second, the surround precoat provides a border area over which colorant having a lower viscosity than the precoat material may spread. Thirdly, the border area also compensates for possible misalignment which might take place during the colorant application process.

The surround area is created as a function of the first shadow mask area, but the specific function or method used to determine the surround area can be adjusted, as will be described in greater detail below. Specifically, the size or the pattern of the surrounding area can be varied. For example, the surround area may be defined as a one-pixel band around the edges of the shadow mask area. Thus, the shadow mask area together with the surround area make up the precoat area where the image enhancing precoat is applied.

Optionally, the precoat area defined by the shadow masks and the surround may be further optimized. Such optimization, shown in Step 3 in FIG. 2, will, under certain circumstances, substantially improve the quality of an image. Precoat areas corresponding to dense image or shadow mask area regions tend to adhere well to the substrate because the precoat pixels in such regions are contiguous with many other precoat pixels. However, precoat pixels corresponding to sparse regions, such as regions including a single, free-standing pixel of colorant tend to have problems adhering to the substrate, even with a one pixel border of precoat therearound. The optimization depicted in Step 3 thus fills in the areas adjacent to sparse shadow masks with more precoat material while trimming the precoat surround areas in dense shadow mask regions, to avoid surplus precoating. Each of the three steps will be described in greater detail hereinbelow.

Figure 3:
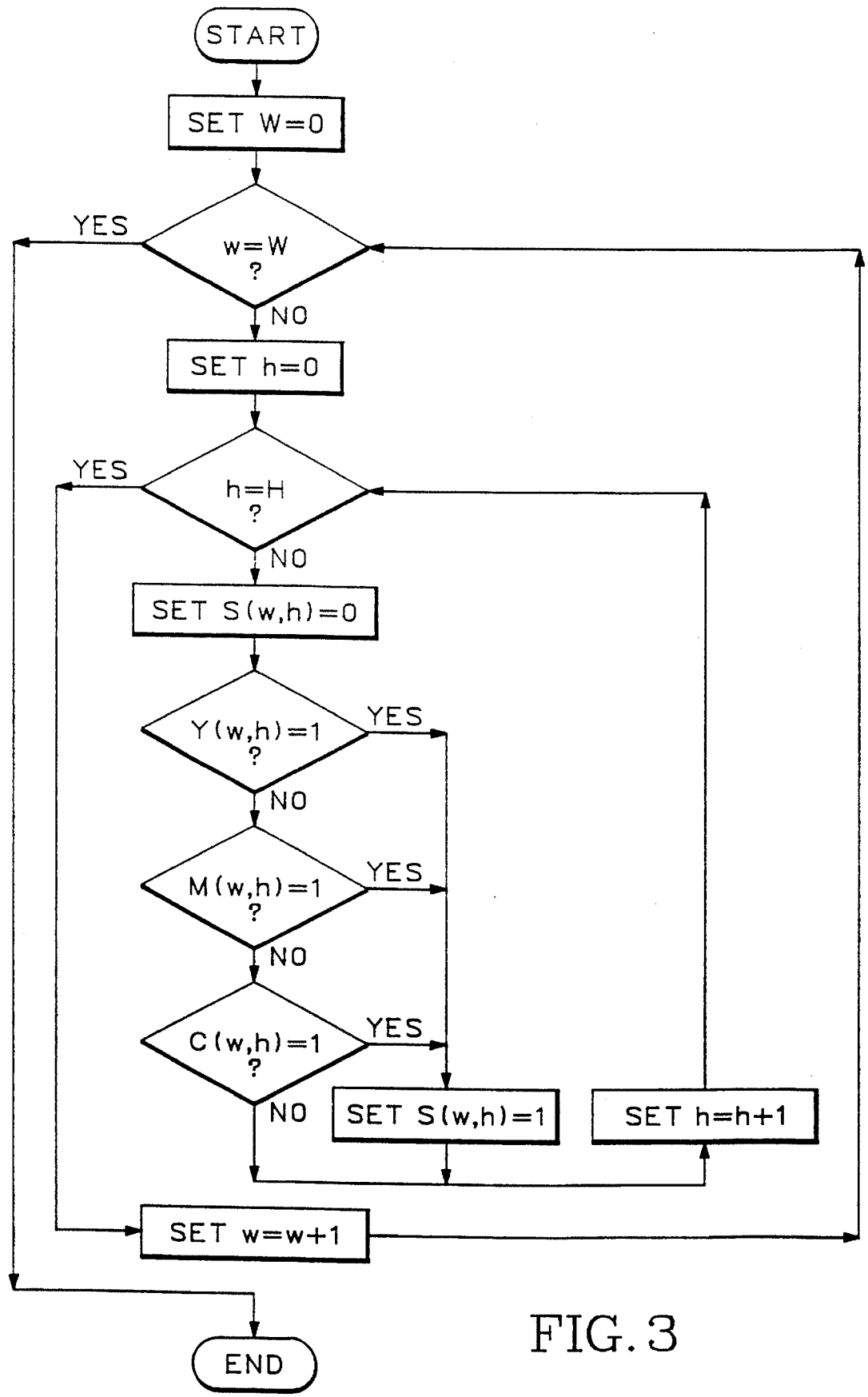
FIG. 3 is a flow chart illustrating one implementation of a step for determining the shadow mask area to which both precoat and colorant materials are applied according to the invention.

Referring now to FIG. 3, one embodiment of Step 1 of FIG. 2 will now be described in detail. The shadow mask defines an area where both precoat and colorant will be deposited to produce an image. In order to determine this area, according to a preferred embodiment of the invention, the colorant information is traversed on a pixel by pixel basis. The process of creating the color information is well-known to those having ordinary skill in the relevant art and will not be elaborated on herein. To perform this process, a variable, w is first initialized to zero. w specifies a particular column of pixels on plain paper, and w ranges from 0 to the constant W, which is the width of the substrate in pixels. If w is not yet equal to W, the variable h is also initialized to zero. h specifies a particular row of pixels on the substrate, and h ranges from 0 to the constant H, which is the height of the substrate in pixels. Thus, a combination of w and h specifies a unique pixel on the substrate, and the specified pixel corresponds to a pixel in the shadow mask array S. Once a particular column, w is set, all the pixels in the column are examined on a pixel by pixel basis by incrementing h by one (set h=h+1) as shown in FIG. 3.

The shadow mask array S is a two dimensional array, according to the preferred embodiment. S(w, h) specifies a unique pixel, and its stored value indicates whether the precoat material is deposited over the pixel. Prior to setting specific elements of S(w, h) to indicate that those corresponding pixels will receive both colorant and precoat, all elements of the array are initialized to zero to indicate that no precoat material is to be deposited over the pixel as shown by set (w,h)=0 in FIG. 3. Upon examining the color information, if any colorant is to be deposited over the pixel in question, S(w, h), is set to one. The color information is stored in three sets (Y, M, C) of two-dimensional arrays. Yellow (Y), magenta (M) and cyan (C) arrays separately keep the color information corresponding to that particular color for each pixel on the plain paper. For example, a stored value in Y(w, h) specifies whether the yellow colorant is to be deposited over a pixel located at the with column and with row. If the stored value is 1, the yellow colorant material is to be deposited over the pixel. More than one color may be deposited over the same pixel if corresponding color arrays so specify.

For the purpose of determining whether image enhancing precoat is to be deposited on a given pixel, it is sufficient to ascertain whether any colorant is intended for placement at that pixel. After S(w, h) is initialized to zero, Y(w,h), M(w,h) and C(w,h) are examined one at a time. As soon as one of them is found to have a value of one, the corresponding shadow mask array element S(w, h) is set to one. In FIG. 3, a series of three questions, i.e., Y(w,h)=1?, M(w,h=1)? and C(w,h)=1? examines the color information, and as soon as one of the examinations is affirmative, a corresponding shadow mask element is set by S(w,h)=1 and no further inquiry takes place. On the other hand, if none of these color arrays has value 1 for the same pixel, S(w, h) remains zero. At this point, regardless of the result of the examinations, h is incremented by one for the next iteration.

This process repeats for all the pixels in the same column specified by w. When all the pixels in the same column were examined, h would be incremented to the constant, H. Thus, the test h=H is satisfied. Accordingly, w is incremented by one to specify the next column for the examination of all the pixels in the adjacent column. When all the pixels are examined on a column and row basis, w=W is satisfied. Thus, Step 1 terminates as shown in FIG. 3. The shadow mask array, S now stores the information pertaining to the area on which the precoat material and colorant are applied.

Referring now to FIG. 4, it will be seen in detail how the surround area will be determined based upon a predetermined filter and the shadow mask array S. The filter or mask is a two-dimensional array designated by M (k, 1), where k ranges from 0 to K−1 and 1 ranges from 0 to L−1. K and L are constants, and they limit the size of the filter. For example, as shown in FIG. 4A, the filter M is 3 pixels wide and 3 pixels long. Thus, both K and L are 3 in this example. The size of the pixel in the filter M corresponds to that of a pixel on the substrate. In the example, the lower left pixel of the filter is identified by M (0,0). The filter M is set to a predetermined pattern as shown in FIG. 4A by setting M(0,0), M(0,2), M(1,1), M(2,0) and M(2,2) to one, while setting the rest of elements in the array to zeroes. This pattern of zeroes and ones determines how the shadow mask area will be expanded to create the surround areas on the boarder of the shadow mask area.

To explain the expansion process, a simplified case is conceptually explained using FIG. 4. For example, FIG. 4B diagrammatically shows a shadow mask area designated by S. FIG. 4C is an enlarged view of pixels in the circled area in FIG. 4B. Since the circled area is on the border between the shadow mask area and its adjacent areas, FIG. 4C shows that two pixels, S(11,11) and S(10,10) are a part of the shadow mask area while the rest of pixels is not. When the filter M is placed over the pixels that are a part of the shadow mask area, the filter M specifies how the shadow mask area is to be expanded. Thus, when the filter M of FIG. 4A is placed over the shadow mask area as shown in FIG. 4C, M(0,0) and M(2,2) are respectively superimposed on S(9,9) and S(11,11). Since S(11,11) and S(10,10) are a part of the shadow mask area and the filter M specifies the predetermined pattern, the adjacent pixels S(9,11), S(9,9) and S(11,9) are included in the surround area to receive the additional precoat material over their pixels. As the mask M moves around over the shadow mask area and when S(9,11), S(9,9) and S(11,9) are placed at a center of the mask, according to a preferred embodiment of the invention, these pixel locations are included in the surround area. As a result, the shadow mask area is now expanded to create the surround area.

To depict the preferred method for implementing the procedure broadly shown in step 2 of FIG. 2, FIG. 5 will now be described in detail. As in Step 1, all the pixels on the substrate are compared on a pixel by pixel basis against the filter M. Variable w specifies a column and ranges from 0 to W, which is a constant specifying the width of the substrate in pixels. Variable h specifies the row and ranges from 0 to H, which is a constant specifying the length of the substrate in pixels. The pixel by pixel comparison of Step 2 is different from that of Step 1 in that every pixel in the filter M is compared against every pixel in the substrate. Accordingly, there are two more inner loops for iteration based upon k and 1 within the outer loop based upon w and h. The filter M is a two-dimensional array defined by M(k, l), where k ranges from 0 to K and 1 ranges from 0 to L. K is a constant specifying the width of the filter M in pixels, while L is a constant specifying the length of the filter M in pixels. According to the embodiment shown in FIG. 5, both K and L must be odd numbers. When w is smaller than W and h is smaller than H, k is initialized to zero. At the same time, the precoat array P (W,h) is also initialized to zero. This two-dimensional array P defines the surround area adjacent to the shadow mask area and the shadow mask area. If P(w,h) is set to one, a corresponding pixel on the plain paper receives at least the precoat material. To proceed to the inner loop, if k is not equal to K or P(w,h) has not been set to one, 1 is initialized to zero. Then, the inner loop compares 1 to L. If 1 is not yet L or P(w,h) has not been set to one, a test to expand the shadow mask area for creating the surround area is now performed.

Figure 5:
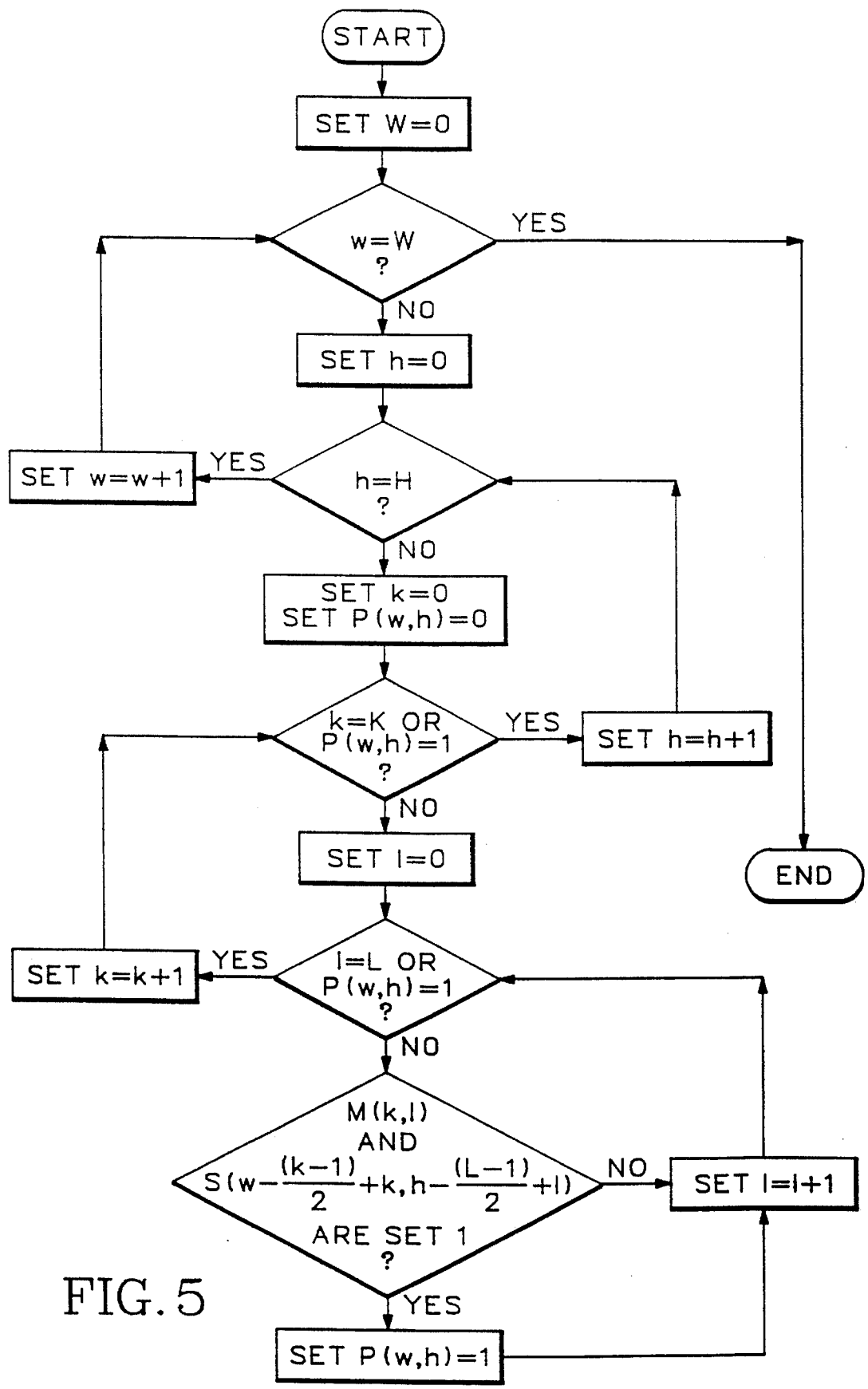
FIG. 5 is a flow chart illustrating one implementation of a step to determine the surround area.

Still referring to FIG. 5, to determine whether P(w,h) is set to one, two conditions have to be satisfied. The first condition is that the pixel in the filter M specified by M(k,l) has been set to one. The second condition is that for the given values of k and 1, the pixel in the shadow mask array specified by S(w−(K−1)/2+k, h−(L−1)/2+1) has also been set to one. S(w−(K−1)/2+k, h−(L−1)/2+1) represents a pixel in the shadow mask area that corresponds to the relative position of the filter M for a given set of k and 1 when the center of the filter M is superimposed on the shadow mask pixel at S(w, h). While in the inner loops, if any of filter pixels at M(k,l) has been set to one and the shadow mask pixel that corresponds to the relative position of the filter pixel in question has been also set to one, the precoat array at P(w, h) will be set to one. It is also noted that elements in the precoat array pixels which represent the shadow mask area are also set to one during this determination. Thus, the precoat array defines an area that include both the shadow mask area and the surround area. During the iteration of the inner loop, variable, 1 is incremented by one to examine every pixel in the same column of the filter M. When the entire row is finished, k is incremented by one to move to the next column in the filter M. Thus, the pattern specified in the filter M expands the shadow mask area to create the precoat surround area. If the filter M has a 3 by 3-pixel pattern as shown in FIG. 4A, for every marked shadow mask pixel, its four surrounding corner pixels are marked as precoat area pixels. If, on the other hand, every mask pixel is marked, every side and every corner of each of the marked shadow mask pixel is expanded to be included in the precoat array. The latter pattern provides a wide surround area. The former pattern creates a narrower surround area for a better image-enhancing output. In addition, the former pattern also saves some nominal amount of print head life. When all the pixels in the filter M are compared against the corresponding pixels in the shadow mask area, h is incremented by one to repeat the inner loop. This is repeated until all the pixels in the same column of the shadow mask area are compared. Then, w is incremented by one to compare the next column in the shadow mask area against the filter M for the inner loop. Upon completion of Step 2, the precoat area array P defines the total area where the precoat materials will be deposited.

Figures 6A, 6B, 6C, 6D, 6E, 6F, 7B:
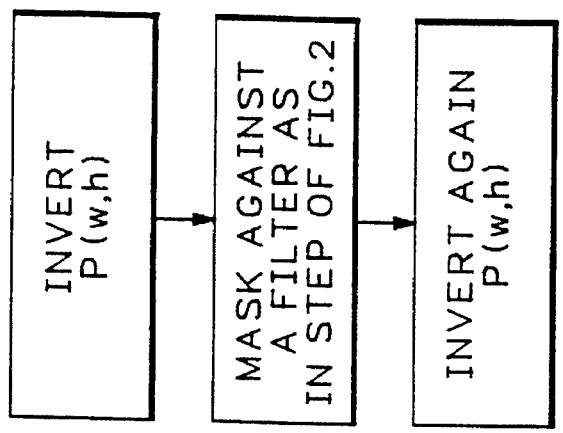
FIG. 6A illustrates one row of a two-dimensional pixel array representing a portion of the shadow mask area.
FIG. 6B is a resulting shadow mask from the array depicted in FIG. 6A, after application of a mask.
FIG. 6C is an inverted shadow mask area of FIG. 6B.
FIG. 6D is a resulting expanded inverted shadow mask area of FIG. 6C, after application of a mask.
FIG. 6E is a resulting double-inverted expanded shadow mask area of FIG. 6D.
FIG. 6F is a copy of FIG. 6A, which is provided for a convenient side-by-side comparison with FIG. 6E.
FIG. 7B is a general flow chart illustrating another implementation of a step for optimizing the shadow mask area and the surround area to which the precoat material is applied according to the invention.

Once the precoat area is determined in Step 2, an optional Step 3 can be performed to optimize the precoat area. The optimization is to counteract a specific phenomena created by a particular precoat formulation. While some formulas for the precoat allow colorant to adhere in a dense shadow mask region, they do not allow colorant to adhere well in a sparse shadow mask region. An improvement is made by filling the sparse shadow mask area with a greater area of precoat material and reducing the precoat area around the dense shadow mask area. For example, reference is made to FIG. 6A, which depicts a row of shadow mask area. For the sake of simplicity, only one row will be considered in the following description. When a 7 by 7 filter with every pixel set to one is applied to the shadow mask area, the surround area indicated by the circled ones is created as shown in FIG. 6B. By leaving the dense surround area of FIG. 6B such as between the original second and third ones from the left edge of FIG. 6A and trimming the precoat area along the dense area such as the original ones on the right hand side of the row in FIG. 6A, the precoat area indicated by the underlined ones in FIG. 6E is obtained.

Figure 7A:
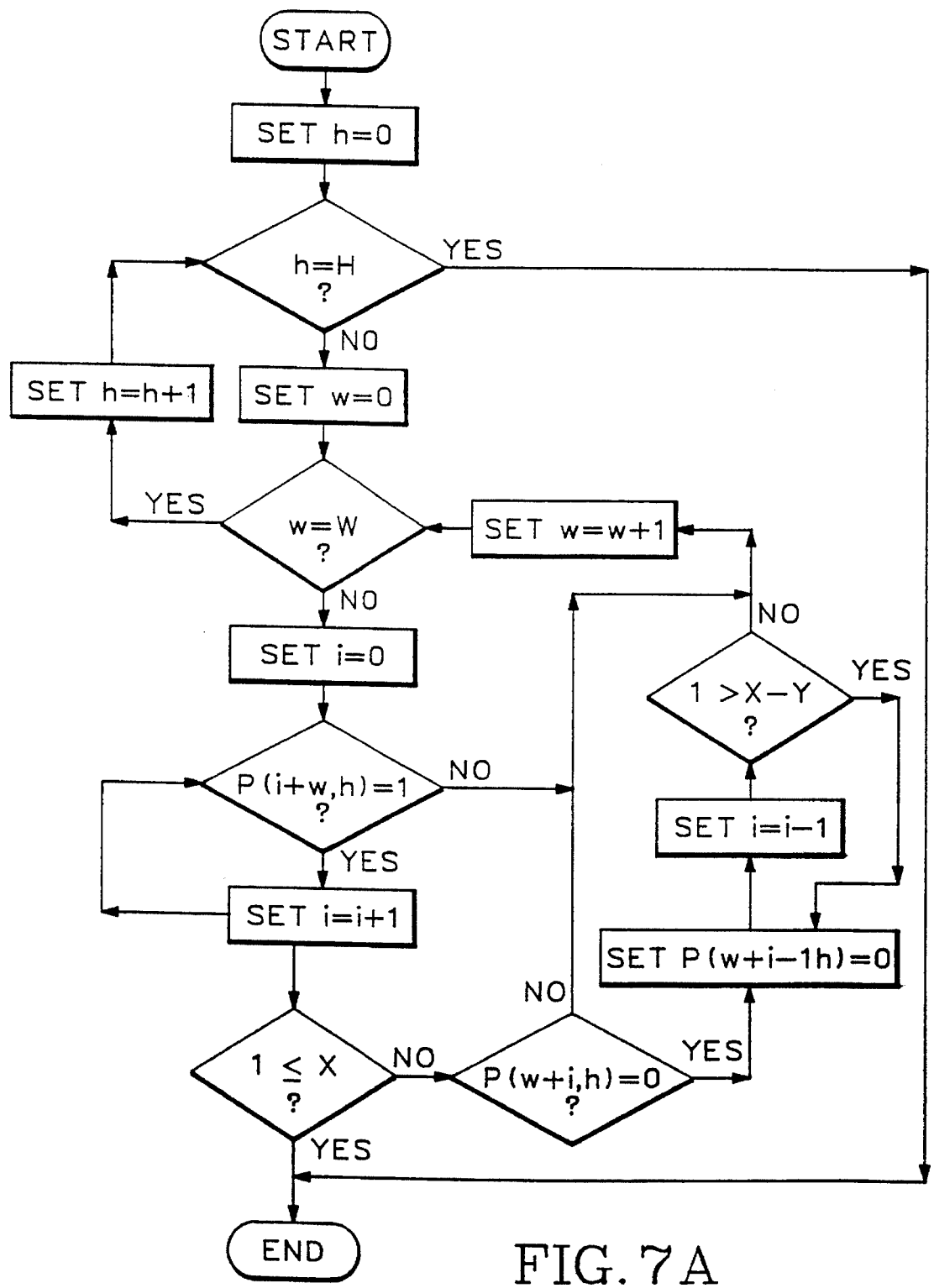
FIG. 7A is a flow chart illustrating one implementation of a step for optimizing the shadow mask area and the surround area to which the precoat material is applied according to the invention.

One embodiment of Step 3 is illustrated by FIG. 7A. The edges of the precoat areas are trimmed by examining the number of contiguous pixels from the pixel in question, When there are more than a predetermined number of contiguously marked pixels and the immediately adjacent pixel to the most peripheral pixel of the contiguously marked pixels is not marked, the peripheral pixels are turned off. For example, after a 7 by 7 filter is used to create the shadow mask area, a 5 by 5 inverse filter is run against the shadow mask area and the surround area. The inverse filter specifies a pattern to convert the on-pixels to off-pixels. Since the 7 by 7 filter creates at least 3 pixel-wide surround area, the 5 by 5 inverse filter turns off the on pixels that are two peripheral pixels which are surrounded by any other off pixels in this example.

One way to implement Step 3 is shown in the flow chart of FIG. 7A. h and w respectively represent the row and the column of a pixel on the plain paper substrate. While the variable, h ranges from 0 to the constant H, which is the height in pixels, the variable, w ranges from 0 to W, which is the width in pixels. To start, h is set to zero. If h is not yet equal to H, then w is initialized to 0. When w is not yet equal to W, a counter i is initialized to one. One element of the precoat area array P is examined at a time. If the current element, P(i+w, h) has been set to one, the counter is incremented by one in step i=i+1. If the counter i is equal to or smaller than the predetermined surround width, X(i≦x), the next precoat pixel is examined. The examination is repeated for each of the peripheral pixels P(i+w, h) in the predetermined X-pixel width. If any of the pixels in the X-pixel wide surround area has not been turned on, w is incremented by one (w=w+1) and a new cycle of examination starts. On the other hand, if all the pixels in the X-pixel wide surround area are turned on, the immediately adjacent pixel, P(w+i,h) is examined where i=X. If this immediately adjacent pixel has been turned off, X-Y number of peripheral pixels on the edge of the precoat area will be turned off by setting P(w+i−1, h) to zero (P(w+i+1,h)=0). This inverting process is repeated while i >=X-Y, where X-Y is the number pixels that will be turned off. When this process is finished, w is incremented by one (w=w+1). Although the flow chart in FIG. 7A shows the increment of h for rows, for the sake of simplicity the above described inversion process in this direction is not included in the flow chart. Thus, the constant H is 1. When all pixels in this row h are examined, the process ends.

Another embodiment for Step 3 is described in FIGS. 6 and 7B. FIG. 7B describes the embodiment in general terms. The precoat area P is inverted first, then, a normal filter M of a desired size is used to expand the inverted area as described in Step 2 of FIG. 2. Lastly, the expanded inverted area is once again inverted. As a result, the same effect as the first embodiment illustrated in FIG. 7A is obtained. Instead of inverting a portion of the surround area, this alternative embodiment first inverts every pixel in the precoat area as shown in FIG. 6B to achieve the inverted pixels of FIG. 6C. A normal filter that is similar to one described in Step 2 of FIG. 2 is run against the inverted pixels, as shown in FIG. 6C. In this example, the filter is a 5×5 pixel in size, and every pixel has been set to one. As a result, the edges of the on pixels are expanded to the pixel pattern as shown in FIG. 6D. When all the pixels in FIG. 6D are inverted again, the pixel pattern in FIG. 6E is obtained. A series of two inversions has led to the same result as the first embodiment. Since the second embodiment can use the same process as described in Step 2 of FIG. 2 and the inversion of entire pixel array is relatively simple, the second embodiment may be easier to implement than the first embodiment.

Some or all of the above described steps in determining the precoat area may be combined into a single step in another embodiment of the invention. Although the complexity of the single process increases due to a more computation-intensive nature of the implementation, some memory space can be saved as a trade-off. For example, this "on-the-fly" approach combines the determination of the shadow mask area and the surround area into a single step without storing an intermediate result in the shadow mask array. To accomplish this, the color information stored in the three sets (Y, M, C) of two-dimensional arrays is directly compared against the filter to create the precoat area without first creating and storing the shadow mask area. The computation may be performed during actual printing or may be performed prior to printing. Thus, a memory space used for storing the shadow mask area is saved.

The "on-the-fly" approach further includes the above described optimization step. In addition to combining the steps of creating the shadow mask area array and the surround area array, the optional step of optimizing the precoat area array is performed on a "on-the-fly" basis. To accomplish this, one approach is to implement a more sophisticated filter such as a three-dimensional filter in which layers of a two-dimensional filter are stacked on top of each other. Thus, for example, after the shadow mask area is expanded according to one layer of the filter, another layer of the inverse filter specifies how the expanded area should be reduced or further enlarged. This combined process may save further memory space as no intermediate result is stored in an additional memory array.

According to another embodiment of the invention, the image enhancing coating may be applied as an aftercoat over the colorant material instead of underneath the colorant material as a precoat. Such an aftercoating is applied over the colorant material to effectively seal the deposited colorant. As one of the purposes of applying the precoating is to substantially smoothen the rough surface of the substrate, the aftercoating may be applied for the purpose of preventing the colorant material from dropping or otherwise becoming separated from the substrate. The aftercoating is, of course, preferably transparent, although it may contain colorant, usually to match the color of the substrate. In determining the extent to which the aftercoat will be applied for this embodiment, the same steps of determining the shadow mask area and the surround area as described above are applicable.

According to yet another embodiment of the invention, two image-enhancing layers of coating including a precoat and an aftercoat may be applied to sandwich a layer of colorant on the substrate. For this embodiment, one layer of precoat is applied to the surface of the substrate for the purpose of providing a more smooth colorant receiving surface. Then, after the colorant material is deposited over the precoat material, an additional layer of aftercoat is deposited at least over the area of the colorant. The aftercoat may cover only the shadow mask area, but not the surround area for the purpose of sealing the deposited colorant. The aftercoat material for the second layer application must be transparent so that the appearance of the colorant is not substantially affected by the film that is created by the precoat material. The shadow mask area and the surround area are again similarly determined by the above disclosed methods.

Figure 8:
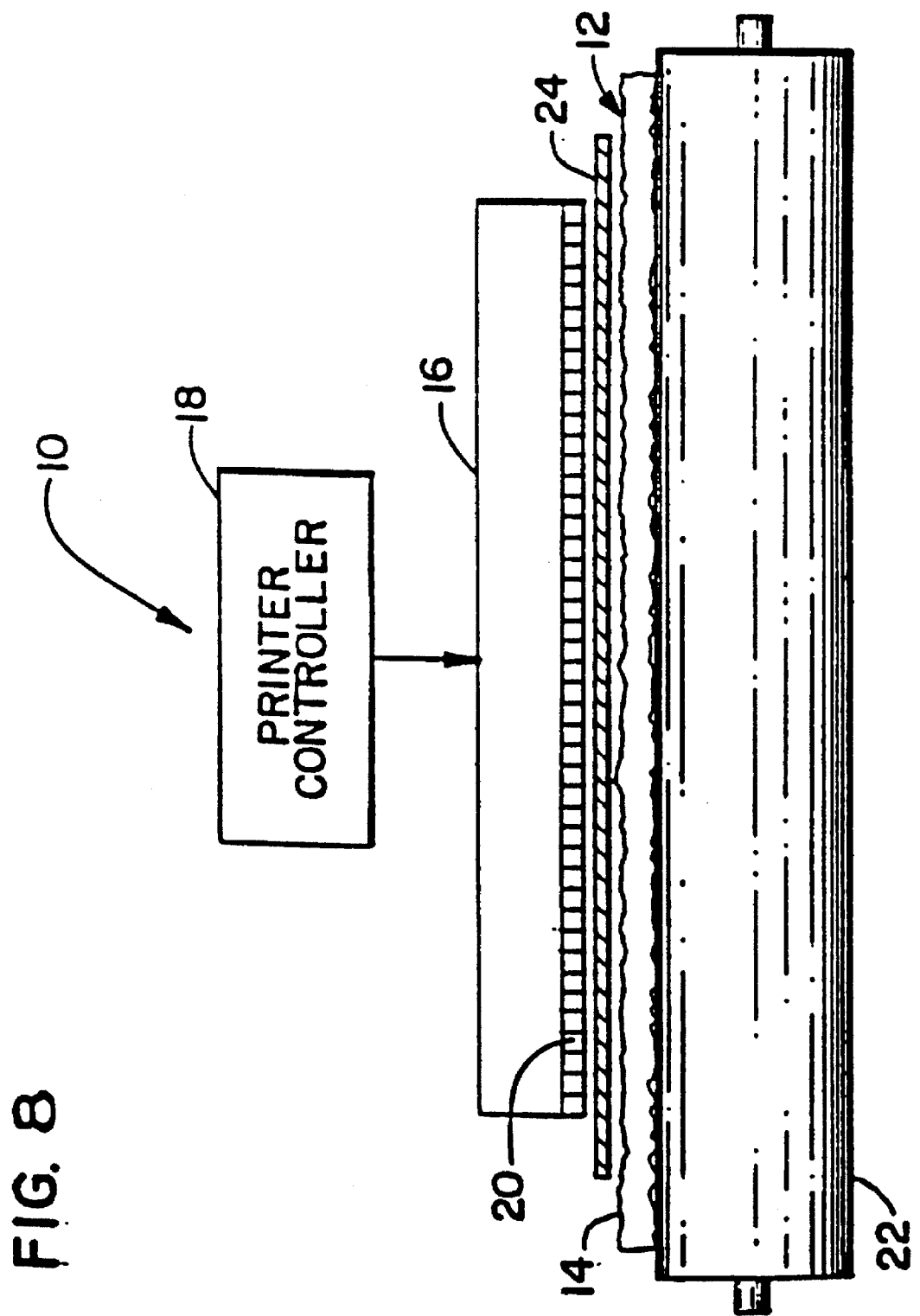
FIG. 8 is a schematic depiction of a thermal mass transfer printing system according to one embodiment of the invention.

FIG. 8 depicts a thermal transfer printing system of the type which may be used to perform the methods which have been described in detail above. System 10 is constructed for thermal transfer printing on a substrate 12, which may have a rough surface 14. System 10 includes a printhead element 16, which is responsive to commands from a printer controller 18. Printhead 16, according to the preferred embodiment of the invention, includes a linear array of heating elements 20, each of which may be heated in response to a command from the printer controller 18 by electrical resistance. The activated heating elements 20 make contact with a ribbon 24 so as to heat colorant or coating or both. Ribbon 24 preferably includes a backing layer which is heat resistant and intended for contact with the print head elements, and a layer of colorant or precoat on the backing layer, depending on whether the ribbon 24 is for transferring precoat or colorant to the substrate. For precoat purposes, the precoat layer preferably includes a first separation sublayer which is formulated to easily and efficiently release from the backing layer when heated, and a second adhesive sublayer which is formulated to strongly adhere to the substrate. Sharp Electronics part number A4JX5RPT is such a multilayered ribbon. For colorant purposes, the colorant ribbon preferably does not contain such sublayers.

A support roller 22 or equivalent surface is provided to support substrate 12 in parallel spaced relationship with respect to the heating elements 20. Thus, the heated colorant or coating is deposited on the substrate surface 12. The increased tension in the ribbon 24 improves the departure of colorant and coating from the ribbon. By selectively controlling the heating elements 20 on printhead 16, printer controller 18 is constructed to control the placement of an image on to the substrate 12. Image creation is generally conducted in printer controller 18, using commercially available software specifically designed therefore, such as Adobe Postscript and the like. The printer assembly and system 10 may be one of several printers that are presently commercially available, such as the A4JX-560 printer which is manufactured by Sharp Electronics.

Figure 9:
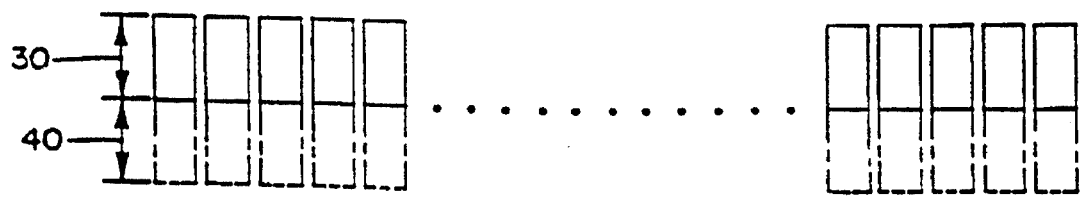
FIG. 9 is a diagram illustrating a full-step vertical displacement of the printhead.
Figure 10A:
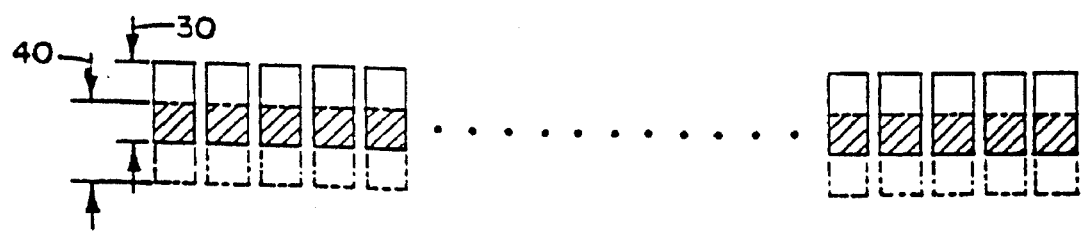
FIGS. 10A and 10B are diagrams illustrating a half-step vertical displacement of the printhead.
Figure 10B:
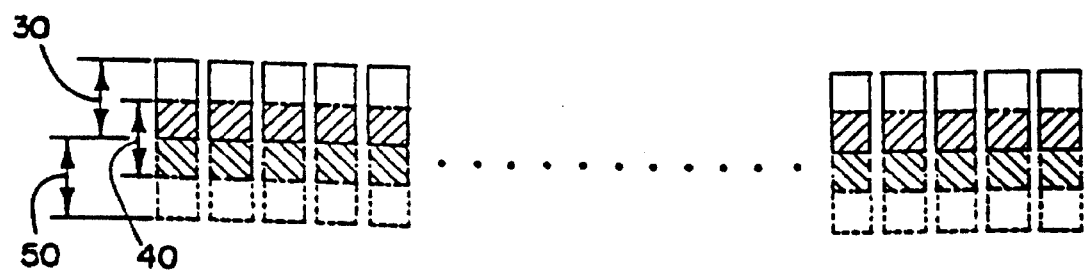

FIGS. 9, 10A and 10B diagrammatically show the differences between a single and multiple delivery of colorant and precoat on the substrate. In other words, according to another embodiment of the invention, the above described printing technology is modified so that at least a part of the same pixel on the substrate receives more than one layer of precoat or more than one layer of colorant, or both, for better adherence of the colorant to the substrate. In FIGS. 9, 10A and 10B, each pixel is rectangular, as is the case for certain types of print head hardware, most notably the A4JX-560 printer which is manufactured by Sharp Electronics.

FIG. 9 shows what may be termed a full-step mode of operation for the printing system. As may be seen in FIG. 9, a solid horizontal line may be formed by two vertically juxtaposed horizontal rows of pixels. In full-step mode, the horizontal line would be printed by applying precoat to the first row, shifting the substrate vertically by a full-step distance which is substantially equal to the vertical height of a pixel, then applying precoat to the second row. Colorant would then be applied on top of the precoat in identical fashion. In full-step mode, the each row of pixels receives only a single delivery of colorant and a single delivery of precoat.

FIGS. 10A and 10B depict an alternative operative mode of the invention, the half-step mode. The half-step mode utilizes hardware which permits the substrate to be vertically shifted, through finer control of roller 22 in FIG. 8, by a distance which is substantially half the distance between rows in the full-step process. This capability permits colorant and precoat alike to be applied in an overlapping relationship that enhances adherence of the colorant to the substrate. The A4JX-560 printer which is manufactured by Sharp Electronics is also the preferred hardware for the half-step mode.

Figure 11:
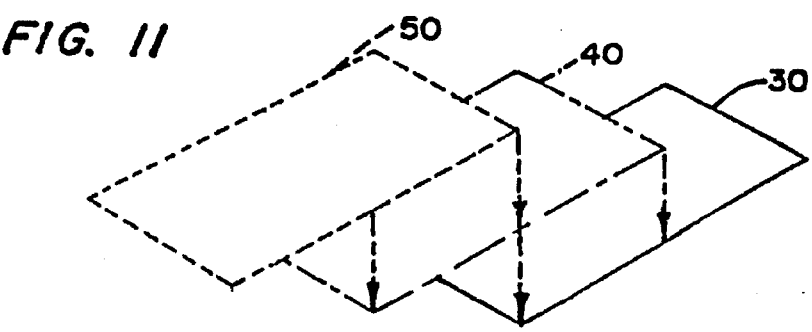
FIG. 11 is an enlargement of the three rows of pixels shown in FIG. 10B.

Now referring to FIG. 11, the three rows of pixels depicted in FIG. 10B are enlarged and viewed from a different view point. A pixel in first row 30 is superimposed by another pixel in the second row 40 to partially overlap the first row pixel. In turn, the second row pixel is superimposed by yet another pixel in the third row 50 to partially overlap the second row pixel.

In the half-step mode, precoat is applied to the first horizontal row 30 of pixels, as is the case in the full-step mode. In FIG. 10A, the first horizontal row constitutes the light upper portion and the middle shaded portion of the illustrated row. After the first row of colorant has been applied, the substrate will be moved approximately half the pixel height in the vertical direction as shown in FIG. 10A. After this displacement, the printhead is located at a position where one half of the printhead element overlaps the first row 30 while the other half is vertically below the first row 30. At this point, a second horizontal line of precoat is applied to the substrate over the second row 40. The shaded area in FIG. 10A depicts the overlap between the two rows. The substrate is again vertically repositioned at this point by a distance which is again approximately equal to half the vertical distance of the full-step. A third row 30 of precoat is applied at this point. Comparing FIG. 9 with FIG. 10B, it will be seen that the half-step mode thus results in a replication of the image printed in the full-step mode. The principal advantage of the half-step mode is that the overlapping effect so created tends to improve adherence of the printed image to the substrate. Another advantage is that the amount of colorant or precoat which is placed on the substrate increases. This is because the pixel substrate receives multiple deliveries of colorant or precoat. The adherence of image-enhancing coating on colorant to the substrate is improved, and the drop out of either material from the substrate is reduced. As a result, an improved color appearance is achieved.

According to the invention, precoat may be applied in half-step mode while colorant is applied in full-step mode, or vice versa. The preferred embodiment, however, is for both precoat and colorant to be applied in half-step mode. In addition, the half-step mode could, within the scope of the invention, be used to apply an aftercoat in lieu of or in conjunction with a precoat.

It should be noted that the preferred printer hardware maintains a registration between the printer ribbon and the substrate during printing. As a result, the preferred printer hardware will not deposit overlapping full-thickness layers of precoat and/or colorant during the half-step mode of printing, because most of the precoat or colorant on the portion of the ribbon that overlies the overlap regions will already have been transferred to the substrate. The second pass over the areas of overlap is expected, though, to facilitate transfer of whatever precoat or colorant that was not transferred during the first pass. It is expected that the half-step mode will result in superior transfer of colorant or precoat to the substrate with such hardware. The half-step mode also has great utility in systems where the printer ribbon and substrate are not so registered.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of printing a predetermined printed image on an image area of a substrate, comprising the steps of:

(a) determining a coating area to which an image-enhancing coating is to be applied to the substrate, said determination being made by applying a filter to said image area, said coating area being larger than said image area and said filter containing a pattern which specifies where the coating area is to be placed by determining pixels in a first area on the substrate where a colorant is to be deposited and determining pixels in a second area which is immediately adjacent to said first area, the coating being placed according to step (b) and step (c), step (b) and step (c) being performed in no particular order;

(b) depositing an image-enhancing coating over said coating area, said coating being applied to said pixels in the first area and the second area, the pixels in the second area partially overlapping said pixels in the first area; and (c) depositing a colorant on said image area, said colorant being applied to said pixels in the first area and the second area, the pixels in the second area partially overlapping said pixels in the first area.

2. A method as recited in claim 1, wherein said determination in step (a) is made on a pixel-by-pixel basis.

3. A method as recited in claim 2, wherein step (b) further comprises:

(i) applying an image enhancing coating to a first pixel area in a first row; and (ii) applying an image enhancing coating to a second pixel area in a second row which is adjacent to said first pixel area, said second pixel area overlapping with said first pixel area.

4. A method as recited in claim 2, wherein step (c) further comprises:

(i) applying a colorant to a first pixel area in a first row; and (ii) applying a colorant to a second pixel area in a second row which is adjacent to said first pixel area, said second pixel area overlapping with said first pixel area.

5. A method as recited in claim 1, wherein said determination in step (a) further comprises a step of optimizing said coating area by expanding said coating area in a vicinity of sparse image regions and reducing said coating area in a vicinity of dense colorant regions.

6. A method as recited in claim 5, wherein said expansion in step (a) takes place on the edges of said image area, whereby a border of said image-enhancing coating is defined about said image area on said substrate, said border being filled with said image-enhancing coating according to a pattern specified in said filter.

7. A method as recited in claim 5, wherein said optimization is accomplished by comparing an inverse filter against an initial determination of said coating area, said inverse filter indicating how much said the coating area is to be reduced.

8. A method as recited in claim 5, wherein said optimization further comprises the steps of:

(i) inverting said coating area to produce an inverted image of said coating area;

(ii) masking said inverted image against a filter to produce a masked inverted image, said filter further being a grid of pixels and specifying a pattern for determining a sparse colorant region and edges of a dense colorant region; and (iii) inverting back said masked inverted image to determine an optimized coating area for application of said image-enhancing coating.

9. A method as recited in claim 5, wherein the image-enhancing coating is applied prior to the application of colorant.

10. A method as recited in claim 5, wherein the image-enhancing coating is applied subsequent to the application of colorant.

11. A method as recited in claim 5, wherein step (d) is performed using a thermal wax transfer printer.

12. A method as recited in claim 5, wherein step (d) is performed using a diffusion dye type printer.

13. A method as recited in claim 1, wherein said filter comprises a grid of pixels.

14. A method of printing an image on a substrate, comprising the steps of:

(a) determining pixels in a first area on the substrate where a colorant is to be deposited;

(b) determining pixels in a second area which is immediately adjacent to said first area;

(c) applying an image-enhancing coat to a first row of said pixels in said first and second areas, said image-enhancing coat having an exposed surface which is adapted for receiving said colorant;

(d) applying said image-enhancing coat to a second row of said pixels which are partially overlapping said first row of said pixels and (e) repeating steps (c) and (d) until all pixels are coated.

15. A method of printing an image on a substrate, comprising the steps of:

(a) determining pixels in a first area on the substrate where a colorant is to be deposited;

(b) determining a second area which is immediately adjacent to said first area;

(c) applying a colorant to a first row of said pixels in said first and second areas, said colorant having an exposed surface which is adapted for receiving said colorant;

(d) applying said colorant to a second row of said pixels which are partially overlapping said first row of said pixels and (e) repeating steps (c) and (d) until all pixels in said first area are coated with a colorant.

* * * * *